(12) United States Patent
Hoffman et al.

(10) Patent No.: US 12,718,284 B2
(45) Date of Patent: Aug. 25, 2026

(54) METHOD AND SYSTEM FOR A BID MANAGEMENT PLATFORM FOR FACILITATING PROPERTY TRANSACTIONS

(71) Applicant: Final Offer LLC, Hingham, MA (US)

(72) Inventors: Judd Hoffman, Hingham, MA (US); Kevin Caulfield, Hingham, MA (US); Tim Quirk, South Dennis, MA (US); J. Danko Fatovic, Zagreb (HR)

(73) Assignee: Final Offer LLC, Hingham, MA (US)

( * ) Notice: Subject to any disclaimer, the term of this patent is extended or adjusted under 35 U.S.C. 154(b) by 702 days.

(21) Appl. No.: 17/750,311

(22) Filed: May 21, 2022

(65) Prior Publication Data

US 2022/0374975 A1 Nov. 24, 2022

Related U.S. Application Data

(60) Provisional application No. 63/191,529, filed on May 21, 2021.

(51) Int. Cl.
*G06Q 30/00* (2023.01)
*G06Q 30/0601* (2023.01)
(Continued)

(52) U.S. Cl.
CPC ......... *G06Q 30/08* (2013.01); *G06Q 30/0611* (2013.01); *G06Q 30/0641* (2013.01); *G06Q 50/167* (2013.01)

(58) Field of Classification Search
CPC ...................................................... G06Q 30/08
See application file for complete search history.

(56) References Cited

U.S. PATENT DOCUMENTS 6,217,448 B1 4/2001 Olsen
6,564,192 B1 5/2003 Kinney, Jr. et al.
(Continued)

FOREIGN PATENT DOCUMENTS

JP 2009-193236 8/2009
WO WO2016191381 A1 12/2016

OTHER PUBLICATIONS

Wang, Xin, Alan Montgomery, and Kannan Srinivasan. "When auction meets fixed price: A theoretical and empirical examination of buy-it-now auctions." Quantitative Marketing and Economics 6 (2008): 339-370.*

(Continued)

*Primary Examiner* — Kathleen Palavecino
(74) *Attorney, Agent, or Firm* — Giordano Law LLC; David A. Giordano

(57) ABSTRACT

The disclosure provides a bid management platform for facilitating sales of property between seller terminals and buyer terminals. A seller terminal provides listings for real estate properties for the bid management platform along with seller terms required for offers. The bid management platform publicly displays offers made for properties. Buyer terminals can access listings via the bid management platform to provide offers, review seller terms, review offers made, and buy properties instantly if seller's buy-it-now price and terms are satisfied. The bid management platform provides an efficient method and system for transparently facilitating real estate transactions and providing visibility that is not provided by current systems.

7 Claims, 7 Drawing Sheets

(51) Int. Cl.
*G06Q 30/08* (2012.01)
*G06Q 50/16* (2012.01)

(56) References Cited

U.S. PATENT DOCUMENTS 7,555,485 B2 6/2009 Soulanville
7,584,139 B2 9/2009 Goodwin
7,599,878 B2 10/2009 Atkinson
8,335,738 B2 12/2012 Ausubel
8,606,679 B1 * 12/2013 Daniel .................. G06Q 50/16 705/36 R
8,630,916 B2 1/2014 Walker
8,799,815 B2 8/2014 Hoellwarth
9,270,648 B2 2/2016 Brander
10,250,754 B2 4/2019 Reith
10,402,921 B2 9/2019 Hudson
11,250,498 B2 2/2022 Clements
12,469,071 B2 11/2025 Clements et al.
2002/0007338 A1 1/2002 Do
2002/0123959 A1 9/2002 Mozley et al.
2003/0041012 A1 2/2003 Gret et al.
2003/0041014 A1 2/2003 Grey et al.
2005/0108125 A1 5/2005 Goodwin et al.
2006/0242056 A1 10/2006 Walker
2008/0126265 A1 5/2008 Livesay et al.
2008/0147566 A1 6/2008 Malik
2008/0319890 A1 * 12/2008 Urbanski .............. G06Q 40/04 705/37
2012/0030623 A1 2/2012 Hoellwarth
2012/0084168 A1 4/2012 Adair et al.
2012/0136745 A1 5/2012 Chalemin et al.
2013/0006798 A1 1/2013 Yushuva
2013/0046650 A1 2/2013 Geurts et al.
2013/0054317 A1 2/2013 Abhyanker
2013/0091047 A1 4/2013 Hough et al.
2013/0103530 A1 4/2013 Tilford et al.
2013/0232024 A1 9/2013 Nasiri
2014/0330664 A1 11/2014 Lisitza
2015/0170264 A1 6/2015 Mosley
2015/0350163 A1 12/2015 Brander
2016/0021524 A1 1/2016 Xi
2016/0042447 A1 2/2016 Nasiri
2016/0098787 A1 4/2016 Caldwell
2016/0343052 A1 11/2016 Hudson
2017/0076363 A1 3/2017 Le
2018/0220008 A1 8/2018 Reith
2020/0320615 A1 * 10/2020 Penner .................. G06Q 30/08
2022/0261883 A1 * 8/2022 Miller ................ G06Q 30/0641
2023/0368283 A1 * 11/2023 Wang .................. G06Q 30/018

OTHER PUBLICATIONS

International Search Report and Written Opinion, PCT/US22/30416, Sep. 9, 2022, ISR=USPTO.

Caylor, P. et al., “Rbuy and KnitMedia use Web to its fullest,” National Real Estate Investor, 41.8: 8. Jul. 1999.

* cited by examiner 100
106
NETWORK INTERFACE
104
SELLER TERMINAL
102
BID MANAGEMENT PLATFORM

200
NETWORK INTERFACE
206
BUYER TERMINAL
204
BID MANAGEMENT PLATFORM
202

104
NETWORK
INTERFACE
306
SELLER
PARAMETERS
MODULE
304
PROCESSING
MODULE
302

NETWORK INTERFACE

404

BUYER CONDITIONS MODULE

402

PROCESSING MODULE

FIG. 6

METHOD AND SYSTEM FOR A BID MANAGEMENT PLATFORM FOR FACILITATING PROPERTY TRANSACTIONS

PRIORITY

This application claims priority to U.S. Provisional App. No. 63/191,529, filed May 21, 2021. The entire contents of that disclosure are incorporated herein by reference.

FIELD

This disclosure relates to a bid management systems and platforms for managing bids for property transactions.

BACKGROUND

Real estate transactions have historically been opaque processes that do not provide full information regarding the seller's requirements or information relating to competing offers. This dearth of available information does not aid in the sale of properties because buyers must guess many of the details regarding the sale of the property. When making an offer to purchase a property, a buyer does not know the details, such as offer price or terms or contingencies, of other offers submitted. Thus, buyers often submit offers that are not as high or competitive with already received offers. Arguably, this opacity prevents sellers from obtaining the true market value for their property. Therefore, there is a need in the art for a method and system for providing a bid management platform for managing bids for property transactions that provides more clarity regarding the details of the transaction.

SUMMARY

This disclosure provides methods and systems of facilitating sales of property via a bid management platform. The bid management platform may comprise an online real estate selling website with the ability for buyer terminals and seller terminals to interact regarding real estate transactions. Throughout this application, the term "seller" refers to an owner selling a property or a seller's agent selling a property on behalf of an owner or both. A seller may comprise a seller terminal, which may comprise a mobile device owned or operated by a real estate agent, a group of real estate agents, a real estate business, or the owner of a property. Similarly, the term "buyer" includes an individual buyer, a buyer's agent, a group of real estate agents, an investment entity, or any entity seeking to purchase a property. Depending on the context, the term "buyer" may refer to a buyer terminal which may comprise a mobile device owned or operated by a buyer or a buyer's agent or any entity seeking to purchase a property. Seller terminals may comprise seller agent's terminals, and buyer terminals may also comprise buyer agent's terminals.

In one aspect, the disclosure provides a computer-implemented method of facilitating a sale of property using a bid management platform. The method includes registering a seller terminal with the bid management platform; receiving, at the bid management platform from the seller terminal, seller information comprising identification details of a property, a list price, and seller terms, wherein one of the seller terms comprises a selectable option; sending, from the bid management platform to the seller terminal, a communication notifying seller terminal that the property is required to be sold if the bid management platform receives an offer to purchase the property that comprises an offer price equal to or greater than the list price and acceptance of the seller terms; creating, at the bid management platform, a listing comprising the identification details, the list price, and the one or more seller terms; by the bid management platform, causing the listing to be displayed on a website; assigning, at the bid management platform, an option value to selectable option, wherein the option value comprises a dollar amount or a percentage of an offer price; registering a buyer terminal with the bid management platform; receiving, at the bid management platform from the buyer terminal, an offer to purchase the property, the offer comprising the offer price and an affirmative selection of the selectable option; by the bid management platform, starting an offer window timer; verifying, by the bid management platform, financial wellness of a buyer associated with the buyer terminal; calculating, at the bid management platform, a total offer value, wherein the total offer value comprises the sum of the offer price and the option value of the selected option; by the bid management platform, causing the offer to be displayed on the website; upon expiration of the offer window timer, sending, from the bid management platform to the seller terminal, a sale notification comprising a winning offer, winning total offer value, and notification that the property is under agreement for sale; and updating the listing to identify the property as under agreement for sale.

In some embodiments of the method, the seller information further comprises a buy-it-now price and buy-it-now terms and the listing further comprises the buy-it-now price and the buy-it-now terms. In such embodiments, when the offer price equals or is greater than the buy-it-now price, the method further comprises terminating the offer window timer and sending the sale notification.

In some embodiments, the method further comprises comprising displaying the offer on the website. In some embodiments, the option value is received at the bid management platform from the seller terminal.

In further embodiments, the method also comprises sending, from the bid management, platform to the buyer terminal, a winning agreement comprising the offer price, seller terms, and the selected option. In some embodiments, one or more of the seller terms are selected from the group consisting of time to closing date, mortgage contingency, home inspection contingency, condominium association due diligence, homeowner's association due diligence, tenant occupation, and home sale contingency.

In additional embodiments, the method further comprises registering a plurality of buyer terminals with the bid management platform; receiving, at the bid management platform from one of the plurality of buyer terminals, a second offer to purchase the property, the second offer comprising a second offer price and the selected option; calculating, at the bid management platform, a second total offer value for the second offer, wherein the second total offer value comprises the sum of the second offer price and the option value of the selected option; and upon expiration of the offer window timer, determining the winning offer as the offer having the highest total offer value. In certain embodiments, the method comprises causing the second offer to be displayed on the website.

Another aspect of this disclosure is directed to a system for facilitating a sale of property. The system comprises a seller terminal comprising a seller application, wherein the seller application is configured to set a list price and set seller terms, wherein one of the seller terms comprises a selectable option. The system also comprises a plurality of buyer terminals comprising buyer applications, each buyer application configured to submit an offer price and to select the selectable option. The system also comprises a bid management platform comprising a network interface and configured to: communicate with the seller terminal and the plurality of buyer terminals; create a listing comprising the list price and the seller terms; cause the listing to be displayed on a website; assign an option value to the selectable option; using an option price and the option value, calculate the total offer value of an offer received from a buyer terminal, wherein the offer received comprises the offer price and a selection of the selectable option; cause an offer received from a buyer terminal to be displayed on the website; count down an offer window timer; and upon expiration of the offer window timer, send a notification to the seller terminal configured to be executed by the seller application, wherein the notification indicates that a winning offer was received and that the property is under agreement for sale.

A further aspect of this disclosure is directed to a method of managing a plurality of offers via a bid management platform. The method comprises the steps of: posting a listing of a property on a website, the listing comprising a list price and seller terms, wherein the seller terms comprise a selectable option; registering a plurality of buyer terminals to a bid management server in the bid management platform; validating the financial wellness of the buyer terminals; receiving an offer from a buyer terminal, the offer comprising an offer price and a selection of the selectable option; calculating a total offer value based on the offer price and the selected. option; posting the offer on the website; when the offer comprises an offer price equal to or greater than the list price and acceptance of seller terms, submitting the offer to the seller terminal upon successful validation of the buyer terminal; and updating the website to indicate the property is under agreement for sale.

In some embodiments, the method also comprises the step of requiring buyer terminals and seller terminals to comply with one or more rules or procedures. In some embodiments, the process of validating comprises verifying the credit of the buyer associated with the buyer terminal. In some embodiments, the process of validating comprises verifying the assets of the buyer associated with the buyer terminal. In some embodiments, the method comprising verifying the credit of the buyer associated with the buyer terminal and verifying the assets of the buyer associated with the buyer terminal.

Yet another aspect of this disclosure provides a method of enabling a buyer terminal to enter into a purchase of a property associated with a listing on a bid management platform. The method comprises: creating, by the bid management platform, the listing for the property, the listing comprising a list price, seller terms, a buy-it-now price, and buy-it-now terms, wherein the list price, seller terms, buy-it-now price, and buy-it-now terms are received at the bid management platform from a seller terminal; receiving, at the bid management platform from a buyer terminal, an offer to purchase the property, the offer comprising an offer price and acceptance of the buy-it-now terms; comparing, at the bid management platform, the offer price to the buy-it-now price; when the offer price is equal to or greater than the buy-it-now price, sending a seller notification to the seller terminal indicating that the property is under agreement for sale, and sending a buyer notification to the buyer terminal indicating that the property is under agreement for sale; and changing the status of the listing to indicate the property is under agreement for sale. In some embodiments, the method also comprises validating financial wellness of a buyer associated with the buyer terminal.

In some embodiments of the method, the method also comprises generating, at the bid management platform, a winning agreement comprising the buy-it-now price and the buy-it-now terms; and sending the winning agreement from the bid management platform to the buyer terminal.

Another aspect of this disclosure is directed to a system for facilitating the sale of property. The system comprises a bid management platform comprising: a bid management server, wherein the cloud server comprises a processor and a memory module; and a network interface for connecting the cloud server with a buyer terminal and a seller terminal; wherein the memory module stores instructions operative to present a user interface to the buyer terminal and the seller terminal for viewing listings; and wherein the memory module stores further instructions operative to perform the following steps: receive a listing for real estate from a seller terminal at the bid management platform; receive plurality of offers to purchase the real estate listing from a plurality of buyer terminals, each offer comprising an offer price and the selected option; start an offer window timer upon receipt of the first of the plurality of offers; calculate a total offer value based on the offer price and selected term of each of the plurality of offers; at the expiration of the offer window timer, determine a winning offer as the offer from the plurality of offers that has the highest total offer value; and changing the status of the listing to "Under Agreement" upon the expiration of the offer window timer and the determination of a winning offer.

In some embodiments of the system, the buyer terminal and the seller terminal are mobile phones. In some embodiments of the system, the buyer terminal and the seller terminal are computers. In some embodiments of the system, one of the buyer terminal and seller terminal is a mobile phone and the other is a computer.

In some embodiments of the system, the buyer terminal comprises an application installed on a mobile phone or a computer and the seller terminal comprises an application installed on a mobile phone or computer.

In certain embodiments of the system, the system also comprises a verification server for determining financial wellness of buyer terminals. In further embodiments, the network interface further comprises an interface with an agent terminal associated with a real estate agent. In some embodiments, the memory module comprises further instructions to receive a conditional offer from a buyer terminal to purchase real estate associated with a listing.

A further aspect of this disclosure is directed to a computer-implemented method of facilitating a sale of property using a bid management platform. The method includes: registering a seller terminal with the bid management platform; sending, from the seller terminal to the bid management platform, seller information comprising identification details of a property, a list price, and seller terms, wherein the seller terms comprise a selectable option; assigning, at the seller terminal, an option value to the selectable option, wherein the option value comprises a dollar amount or a percentage of an offer price; sending, from the seller terminal to the bid management platform, a communication acknowledging that the property is required to be sold if the bid management platform receives an offer to purchase the property that comprises an offer price equal to or greater than the list price and acceptance of the seller terms; receiving, at the seller terminal from the bid management platform, an offer to purchase the property, the offer comprising an offer price and the selected option, and a total offer value, wherein the total offer value comprises the sum of the offer price and the option value of the selected option assigned by the seller terminal; and receiving, at the seller terminal from the bid management platform, a sale notification comprising a winning offer, a total offer value of the winning offer, and notification that the property is under agreement for sale. In some embodiments, the method also includes approving, at the seller terminal, the listing.

In an aspect, this disclosure provides a computer-implemented method of facilitating a purchase of property using a bid management platform. The method comprises: registering a buyer terminal with the bid management platform; receiving, at the buyer terminal from the bid management platform, information to populate a user interface on a display of the buyer terminal; displaying a user interface on the buyer terminal, the user interface configured to display a listing for a property for sale, wherein the listing comprises a list price and seller terms, wherein one of the seller terms comprises a selectable option; creating, at the buyer terminal, an offer to purchase the property, the offer comprising an offer price and the selected option; sending, from the buyer terminal to the bid management platform, the offer; and receiving, at the buyer terminal from the bid management platform, a notification indicating the offer is the winning offer.

In some embodiments, the offer further comprises a request to change one or more seller terms, In further embodiments, the method also comprises receiving, at the buyer terminal from the bid management platform, a notification that the seller terminal accepted the change request.

In some embodiments, the method also comprises sending, from the buyer terminal to the bid management platform, a communication acknowledging that the property is required to be purchased if an offer submitted by the buyer terminal is deemed the winning offer. In some embodiments, the method also comprises receiving, at the buyer terminal from the bid management platform, a winning offer agreement comprising the offer price, sellers terms, and the selected seller terms.

In another aspect, this disclosure provides a computer-implemented method of facilitating a sale of property using a bid management platform. The method comprises: registering a seller terminal with the bid management platform; receiving, at the bid management platform from the seller terminal, seller information comprising identification details of a property, a list price, seller terms, wherein one of the seller terms comprises a selectable option, and, optionally, a deadline for the bid management platform to accept otters; creating, at the bid management platform, a listing comprising the identification details, the list price, and the seller terms; by the bid management platform, causing the listing to be displayed on a website; assigning, at the bid management platform, an option value to the selectable option, wherein the option value comprises a dollar amount or a percentage of an offer price; registering a buyer terminal with the bid management platform; receiving, at the bid management platform from the buyer terminal, an offer to purchase the property, the offer comprising the offer price and the selected option; verifying, by the bid management platform, financial wellness of a buyer associated with the buyer terminal; calculating, at the bid management platform, a first total offer value, wherein the first total offer value comprises the sum of the offer price and the option value of the selected option; receiving, at the bid management platform from the seller terminal, instructions for the bid management platform to cause the first winning offer to be displayed on the website and to start an offer window timer; by the bid management platform, causing the first winning offer to be displayed on the website; receiving, at the bid management platform, from a second buyer terminal, a second offer comprising a second offer price and the selected option; calculating, at the bid management platform, a second total offer value, wherein the second total offer value comprises the sum of the second offer price and the option value of the selected option; upon expiration of the offer window timer, sending, from the bid management platform to the seller terminal, a sale notification comprising the second offer, the second total offer value, and notification that the property is under agreement for sale; and updating the listing to identify the property as under agreement for sale.

In some embodiments, the method further comprises sending, from the bid management platform to the seller terminal, a communication notifying seller terminal that the property is required to be sold upon the expiration of the offer window timer. In some embodiments, the method also comprises registering a plurality of buyer terminals with the bid management platform. In some embodiments, the method additionally comprises receiving, at the bid management platform from the plurality of buyer terminals, a plurality of offers to purchase the property, each offer comprising an offer price and the selected option. In some embodiments, the plurality of offers are received at the bid management platform while the offer window timer is active. In some embodiments, the method also comprises receiving, at the bid management platform from the seller terminal, a buy-it-now price and buy-it-now terms. In some embodiments, wherein the offer further comprises an expiration, wherein the expiration can be a date, time, or a combination thereof.

In some embodiments where the seller has submitted a deadline for the bid management platform to accept offers, the method further comprises sending, after the deadline has passed, from the bid management platform to the seller terminal, a notification that a first winning offer was determined.

BRIEF DESCRIPTION OF THE FIGURES

FIG. 4 is a block diagram illustrating a buyer terminal.

FIG. 6 is a block diagram illustrating the buy-it-now process via the bid management platform.

DETAILED DESCRIPTION

Figure 1:
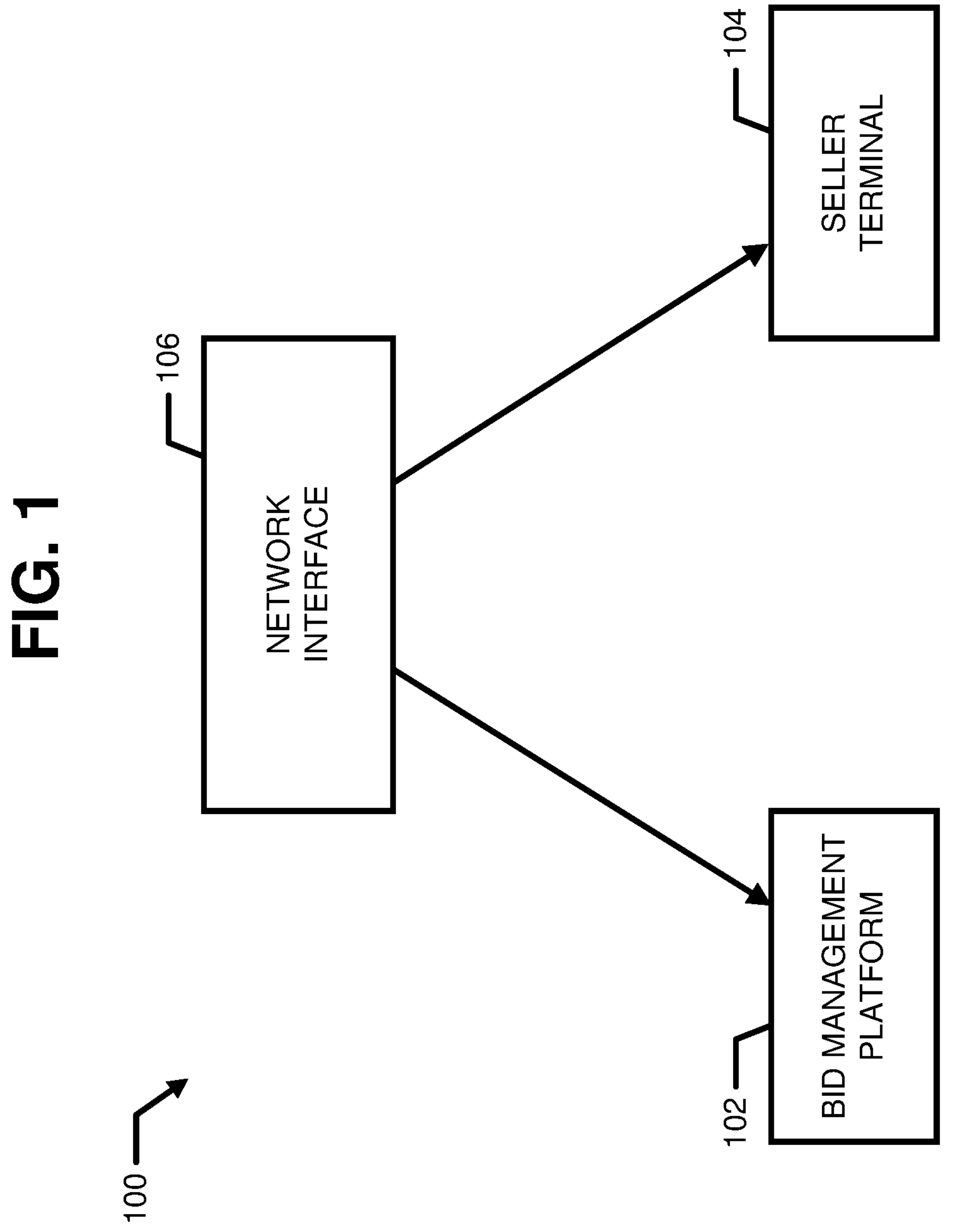
FIG. 1 is a block diagram illustrating the overall system of the bid management platform including a seller terminal.

This disclosure provides methods and systems for facilitating the sale of property, including real estate. Throughout this disclosure, the terms "a" or "an" mean one or more unless context indicates otherwise. In one aspect, the disclosure provides methods for transparently facilitating the sale of real estate using a bid management platform. In the method, a seller terminal registers with the bid management platform via a network interface. The seller terminal can comprise a mobile phone or computer. The bid management platform receives from the seller terminal information comprising identification details of a property for sale, a list price (also referred to herein as the "minimum offer price"), and one or more terms of sale that the seller has selected (also referred to herein as the "seller terms"). The seller terms may comprise dates (e.g., time to close, time to execute a purchase and sale contract), deposit amounts, contingencies (e.g., home inspection contingency, mortgage contingency, sale of buyer's property contingency), allowing for condominium association due diligence or homeowner's association due diligence, tenant occupation, or other terms of sale that the seller can define. For example, the seller can include other terms as seller terms such as property (e.g., a car, artwork, furnishings), appliances, televisions, and other items that an individual might store in a house or on a property. In some embodiments, the seller terminal defines multiple selectable options for each term. For example, a seller terminal can allow a buyer to select a time to close term from selectable options of 30, 60, or 90 days or another number of days.

In some embodiments, the seller terminal assigns a value to one or more selectable options available for one or more seller terms. A seller terminal can assign a positive or negative dollar value to one or more options available for the time to close term. For example, where a seller desires 30 days as the time to closing, the seller terminal can assign a $10,000 value to 30 days and a −$10,000 value to 60 days. The value of seller terms can vary depending on a seller's circumstances. In some embodiments, a seller terminal can assign a value as a positive or negative percentage of a buyer's offer price. In some embodiments, a seller terminal can assign a weighted value to a selectable option so that a particular option carries more weight in a total offer value calculation. For example, if a seller values the waiver of a mortgage contingency more than waiver of a home inspection, then seller can assign a weight, e.g., waiver of mortgage contingency counts as a multiple of other selectable options. In some embodiments, the bid management platform assigns or suggests a value to selectable options available for one or more seller terms.

In some embodiments, the bid management platform also receives a "buy-it-now" price from the seller terminal. The buy-it-now price is a price that, if offered by a buyer, would immediately place the property under agreement for sale. In conjunction with the buy-it-now price, the seller terminal can also set buy-it-now terms. The buy-it-now terms can be different or the same as the seller terms. In some embodiments, the buy-it-now terms do not comprise selectable options. In some embodiments, the buy-it-now terms comprise selectable options but seller terminal does not assign a value to the selectable options. In some embodiments, the buy-it-now terms comprise the selectable options that seller assigned the highest value too. In some embodiments, the buy-it-now terms are different than the seller terms.

In some embodiments, when the seller terminal sends the seller information, in some embodiments the seller terminal also sends an acknowledgement that the owner of the property agrees to be required to sell the property if a buyer makes an offer equal to or greater than the list price and accepts the seller terms. In some embodiments, the bid management platform sends to the seller terminal a seller agreement that contractually binds the seller to sell the property if a buyer makes an offer equal to or greater than the list price and accepts the seller terms. In such embodiments, the bid management platform will not publicly post the listing on a website until the bid management platform receives the seller agreement signed by the owner of the property in the listing. This feature of the disclosure is unconventional. Currently, owners may list their property for sale either by themselves or through a real estate agent. However, the owners are not under any obligation to sell the property, even if they receive an offer matching or exceeding their list price and accepting their terms. In some circumstances, owners have listed property for sale in an effort to learn what the property could potentially fetch on the market. In contrast to this, in some embodiments, the bid management platform requires a seller to be obligated to sell a property when an offer meets or exceeds the list price and accepts and the seller terms, or when an offer includes the buy-it-now price and accepts the buy-it-now terms.

The bid management platform creates a listing comprising the list price, seller terms, and causes the listing to be displayed on a website. In some embodiments, the listing also comprises a buy-it-now price and buy-it-now terms. In some embodiments, the bid management platform operates the website. In other embodiments, a third party operates the website.

The bid management platform registers one or more buyer terminals via a network interface. The bid management platform is configured to receive offers from buy terminals over the network interface. An offer received from a buyer terminal comprises an offer price and options selected for any seller terms that have options. The bid management platform calculates a total offer value by adding the offer price plus the values assigned to the selected options. This calculation allows the seller to evaluate and compare offers beyond just looking at the offer prices. The calculation factors in the value assigned by the seller terminal to seller terms. As a result, the total offer value calculations reflect the values of the seller terms that are important to the seller. In some embodiments, if multiple offers are received from multiple buyer terminals, the bid management platform puts the offers in order based on the total offer value. In some embodiments, the bid management platform displays the offers on a website or causes the offers to be displayed on the website. In some embodiments, the offers are initially only displayed to the seller terminal. In some embodiments, the seller terminal can instruct the bid management platform to publish offers received on the website. In some embodiments, the seller terminal can instruct the bid management server to post the number of received offers on the website. This feature of this disclosure is unconventional because prospective buyers of a property (i) may not know if a seller has received an offer or if a seller has received multiple offers and (ii) do not know the offer price or terms of any other offer submitted.

In some embodiments, the bid management platform verifies the financial wellness of a buyer associated with a buyer terminal prior to the buyer terminal being able to submit an offer. In some embodiments, the bid management platform verifies the financial wellness of a buyer associated with a buyer terminal after an offer has been submitted.

In some embodiments, the bid management platform activates an offer window timer. In some embodiments, after receipt of a first offer that meets or exceeds the list price and accepts the seller terms at the bid management platform, the bid management platform starts counting down a timer until a time when no further offers will be accepted. The time from the receipt of the first offer until expiration of the time is referred to as the "offer window." The offer window can be a duration set by the seller terminal or can be set by the bid management platform. In some embodiments, the offer window ranges from 1-90, 1-60, or 1-30 days. In some embodiments, the offer window is a number of weeks or hours. Upon expiration of the offer window, the bid management platform notifies the seller of the current highest total value offer and changes the listing to under agreement. In some embodiments, the bid management platform populates a contract using the terms from the winning offer and sends the contract to the seller terminal and the buyer terminal. In such embodiments, the agreement executed between the seller and the bid management platform prior to the bid management platform posting the listing and the agreement executed by the buyer and the bid management platform prior to the bid management platform accepting an offer from the buyer terminal comprise the execution of the winning offer agreement. In some embodiments, the bid management platform sends the contract to the buyer terminal for execution. In some embodiments, at this point the seller associated with the seller terminal is bound to accept the terms of the contract. In some embodiments where the offer price matches or exceeds the buy-it-now price and accepts the buy-it-now terms, the offer window is immediately terminated.

This disclosure provides various embodiments of methods and system for providing a bid management platform for sales of property, for example, real estate sales. FIG. 1 is a block diagram illustrating the overall system of the bid management platform 100 including a seller terminal 104. Sellers create a user account utilizing a seller terminal 104 to list their property on the bid management platform 102. Seller terminal 104 comprises a user interface. Typically, listings on the bid management platform 102 are listed by a real estate agent licensed in the state the property is located ("agents") or owners listing a property as a "For Sale By Owner" or "FSBO" listing. Agents register with the bid management platform 102 via network interface 106 and have their license and brokerage information verified prior to using the bid management platform 102. In some embodiments, an owner lists a property as a "For Sale By Owner" or "FSBO" listing, and platform 102 verifies via network interface 106 that the owner owns the property being offered for sale. In some embodiments, the bid management platform accesses online registry and deed databases or other public databases to confirm ownership of the property. In some embodiments, the bid management platform communicates with a third party to confirm ownership of the property.

A seller terminal can connect with a real estate agent via the bid management platform 102 and network interface 106 prior to listing their home. Agents can perform non-listing related services for seller terminals including but not limited to saving homes, saving searches, and scheduling tours on behalf of sellers. Sellers, either owners or owners using an agent, can initiate the listing process via a seller terminal 104.

In some embodiments, to create a listing on the bid management platform 102, a seller terminal 104 sends a request to an agent to create a draft listing on their behalf. This request should include any information necessary or helpful for creating a real estate listing, including but not limited to, the address of the property, full legal contact information for the seller or sellers, or any other identifying information. Once the draft listing is complete, the agent can send it to the seller for review and approval. Alternatively, the agent can directly create a draft listing on behalf of their seller and send the draft listing to the seller for review and approval. In some embodiments, upon the seller's review and approval of the draft listing, seller and the selected agent sign an agreement stating they will use the bid management platform as the exclusive method to accept offers on the listed property. In some embodiments, by creating a listing either via an agent or an FSBO listing, seller is agreeing to be required to sell the property if an offer is received by the bid management platform that meets or exceeds the list price and accepts the seller terms.

In some embodiments, an agreement between the seller and bid management platform or an agreement between the seller, seller's agent, and the bid management platform is presented via a user interface on the seller terminal from the bid management platform 102 via network interface 106. When a seller is using an agent, the seller can authorize the agent to exclusively manage the listing on the bid management platform 102 upon execution of the agreement. In some embodiments, the seller terminal 104 will have read-only access to the listing on the bid management platform 102 and a home dashboard, an interface for presenting information related to the sales associated with the seller terminal.

Figure 2:
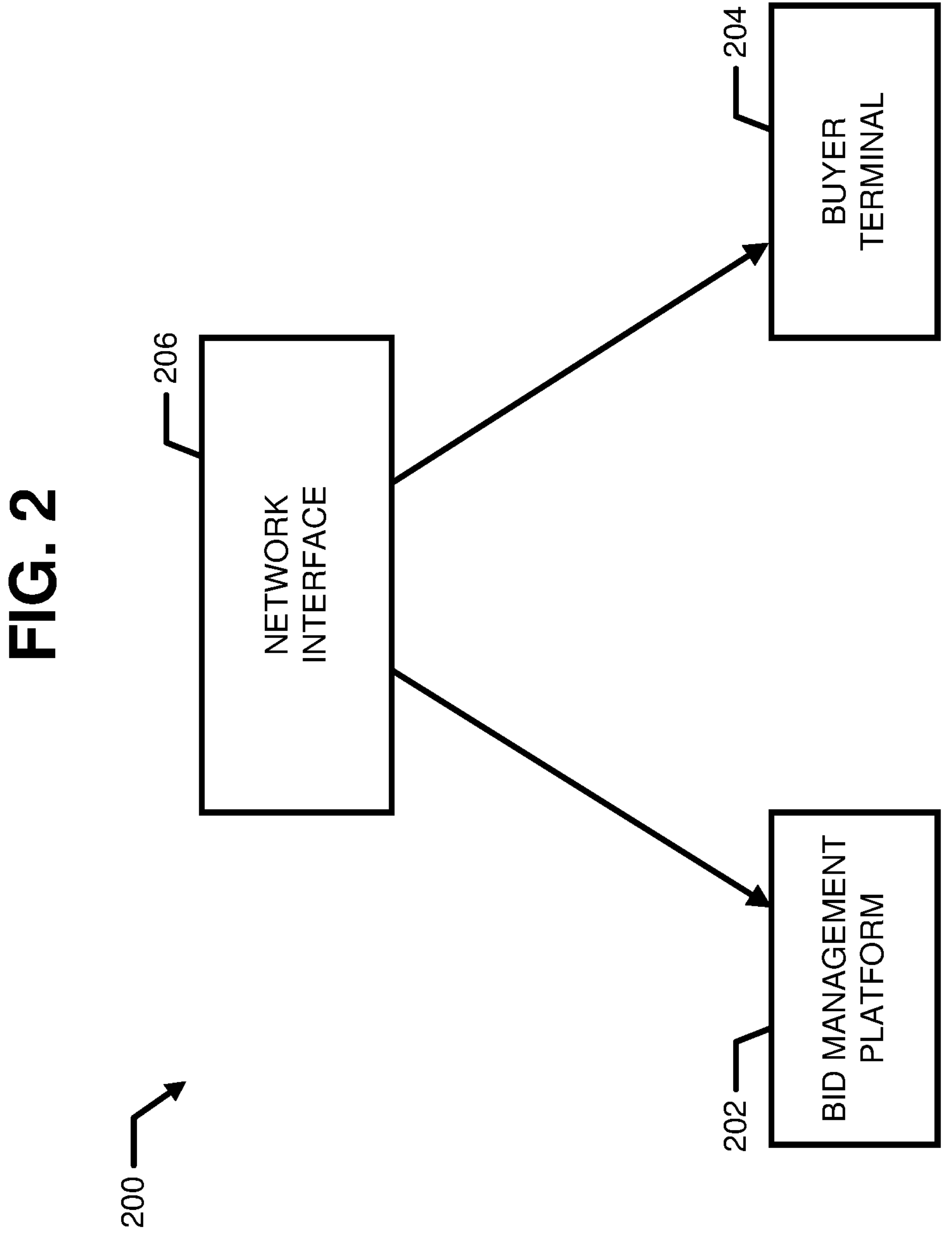
FIG. 2 is a block diagram illustrating the overall system of the bid management platform including a buyer terminal.

FIG. 2 is a block diagram illustrating the overall system of the bid management platform including a buyer terminal 204. Buyer terminal 204 comprises a user interface and uses network interface 206 to access listings on bid management platform 202. A listing includes information about the property and comprise a list price and seller terms. A listing can further comprise a buy-it-now price and buy-it-now terms. A listing can also comprise an offer window duration. Further, a listing can comprise overview description of the property, location, property features, uploaded media (e.g., photos, videos, floor plans, 3D tours), uploaded documents (e.g., seller's disclosures), questions & answers, and information pulled from public sources. A listing can also comprise a statement of property condition, lead paint disclosure, septic system disclosure, smoke detector and carbon monoxide compliance certification, home inspection consumer fact sheet, or any other disclosure. In some embodiments, listings only reference a property currently listed on bid management platform 202. Bid management platform 202 may comprise the same device as bid management platform 102 as in FIG. 1 in some embodiments.

Buyer terminal 204 can access listings via network interface 206. A buyer terminal 204 may respond to listings by submitting an offer to bid management platform 202 via network interface 206. The offer comprises an offer price and selection of terms that have selectable options.

In some embodiments, to evaluate the total value of an offer, seller terminal 104 assigns a positive value or negative value to each selectable option available for reach of seller's terms that seller allows options. The positive or negative value can be a dollar amount, a percentage of the list price, a percentage of an offer price, or a combination thereof. When buyer terminal 204 sends the bid management platform a selected option as part of a submitted offer, bid management platform calculates the value of the option based on the value assigned by the seller terminal. Bid management platform calculates a total offer value of an offer received from a buyer terminal by adding the offer price with the calculated values of the selected options.

In some embodiments, if the seller and seller's agent have agreed to a variable rate commission, the agent may provide 1) the percent commission in a co-brokered transaction and 2) the percent commission in a direct transaction, or provide the net difference in percentage between the two types of transactions. In some embodiments, a "Buyer representation" term is added to listings with variable rate commissions. In some embodiments, when a buyer terminal submits an offer, the buyer terminal includes a selection of the Buyer representation term in the offer. In some embodiments, the value attached to this term is a percentage, equal to the net difference in commissions. In some embodiments, buyers via buyer terminals 204 who make an offer without an agent will be able to accept this term and the bid management platform assigns a positive value equal to the offer price multiplied by the variable rate commission percentage.

In some embodiments, a listing includes buy-it-now price and buy-it-now terms that buyer terminal 204 can access on a website via the network interface 206.

Seller terminals can submit information for listings submitted for immediate publication or scheduled for publishing on a certain date and time pending review by bid management platform. In some embodiments, a bid management platform administrator reviews, approves, and publishes the listing, or will contact the seller's agent with any questions. In some embodiments, the bid management platform reviews the listing without aid of an administrator and approves and publishes the listing. Upon successful review, the bid management platform displays the listing on a website or causes the listing to be displayed on a website. In some embodiments, bid management platform does not review and/or approve the listing before publishing it.

Figure 3:
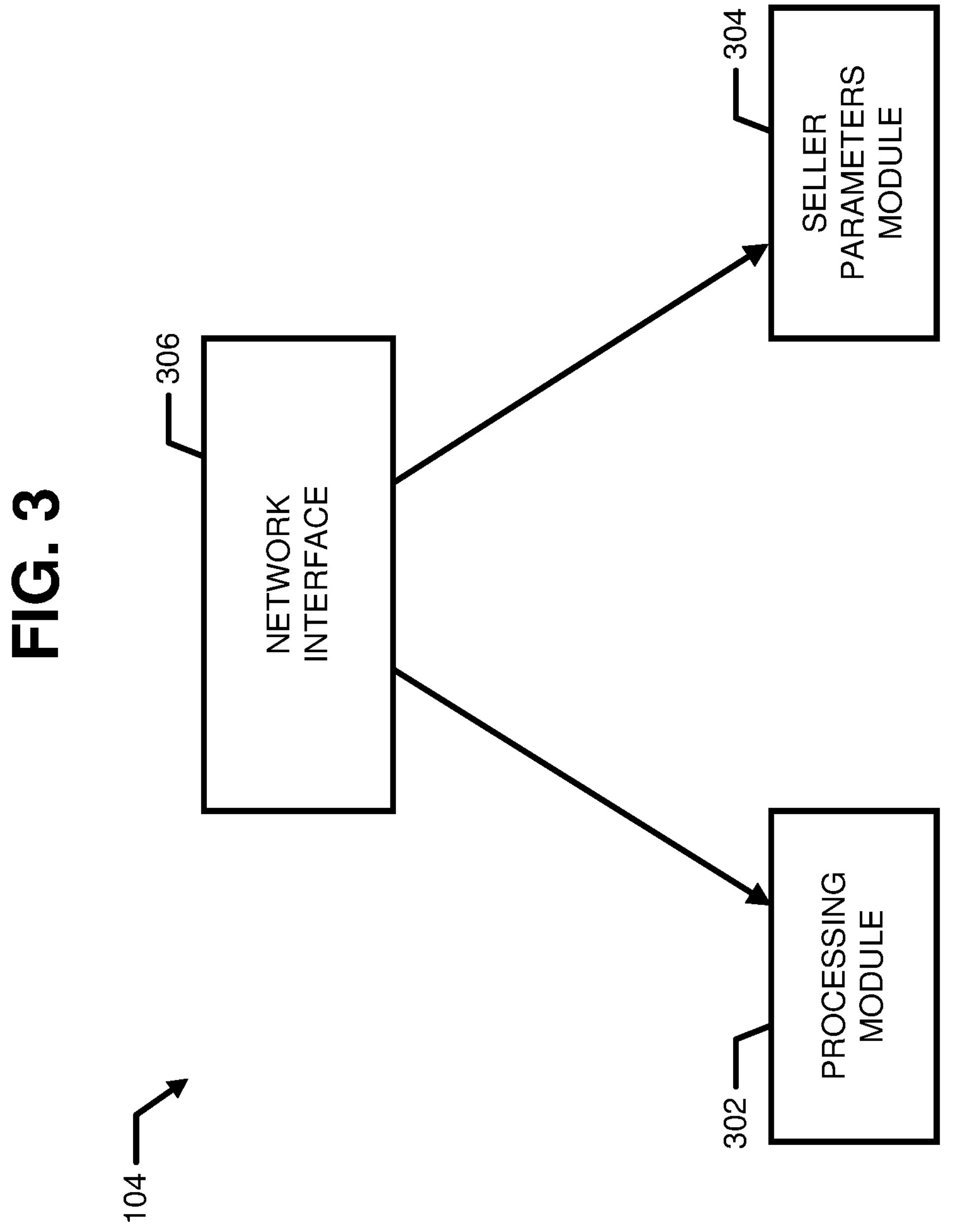
FIG. 3 is a block diagram illustrating a seller terminal.
Figure 4:
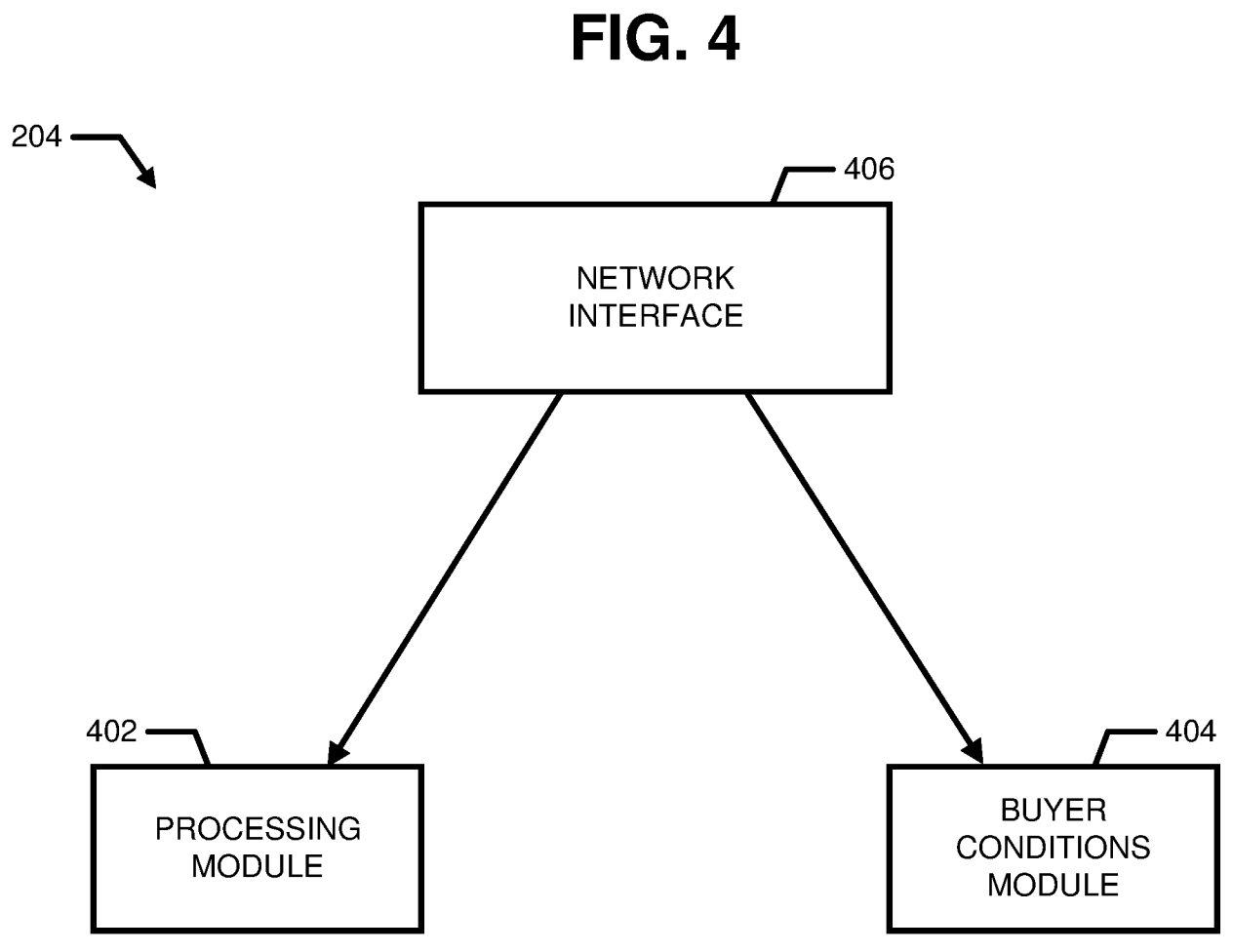

FIGS. 3 and 4 are block diagrams illustrating a seller terminal and buyer terminal, respectively. The seller terminal and the buyer terminal operate to facilitate real estate transactions via the bid management platform. A buyer terminal and seller terminal comprise a processing module (302 and 402 respectively), a network interface (306 and 406 respectively), memory module (304 and 404 respectively), and a user interface (not shown). In some embodiments, the memory module for the seller terminal comprises the seller parameters module 304 which includes pricing information, seller terms, conditions from sellers regarding sale and offers on a property offered for sale, or a combination thereof. A buyer terminal may be a mobile phone or computer. A buyer terminal may also comprise an application installed on the mobile phone or computer. A seller terminal may be a mobile phone or computer. A seller terminal may also comprise an application installed on the mobile phone or computer. In some embodiments of the system, one of the buyer terminal and seller terminal is a mobile phone and the other is a computer.

Once submitted from a seller terminal 104 to the bid management platform 102, a listing can be managed by the seller's agent or the seller. If an offer window is open, in some embodiments, the seller terminal cannot make certain changes to a listing.

Home tour events can be created through the home dashboard and details regarding the home tour events are stored in the seller parameters module 304. Available home tour types can include various options, including without limitation, in-person, virtual, or in-person/virtual. A seller and their agent may remove their listing from the bid management platform service before an offer window begins. Once a listing is in an active offer window, seller and their agent cannot remove the listing per the terms of their signed agreement with the bid management platform. If the seller and their agent wish to remove their listing from the bid management platform service during an active offer window or upon a winning offer being determined, a request to remove should be transmitted to the bid management platform immediately, and may be subject to the penalty as agreed to in their bid management platform seller agreement. In addition, bid management platform reserves the right to restrict or terminate access to the bid management platform service for removing a listing during an active offer window or removing a lister after determination of a winning offer.

Figure 5:
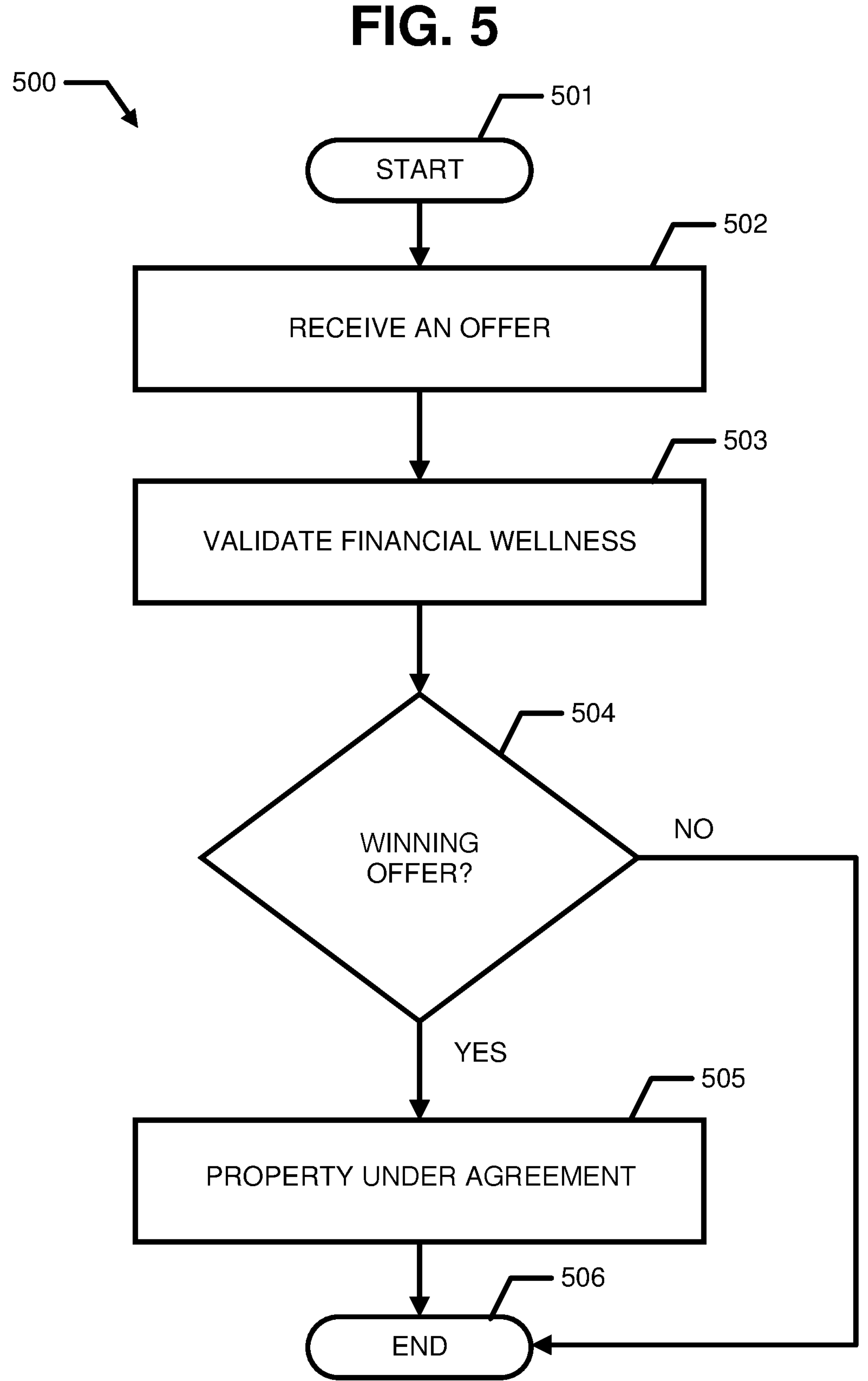
FIG. 5 is a block diagram illustrating the offer process via the bid management platform.

FIG. 5 is a block diagram illustrating the offer process via the bid management platform. Method 500 begins with posting of a listing on a website by the bid management platform. Method 500 may also begin with validation of a buyer's financial wellness so a buyer associated with a buyer terminal cannot submit an offer to a listing on the bid management platform until the buyer's financial wellness is confirmed. In some embodiments, this financial wellness validation step may also occur at another time during method 500. In some embodiments, buyer terminals 204 do not need a user account to browse listings on the bid management platform. In some embodiments, to save homes, save searches, schedule tours and gain access to real-time pricing information, a basic user account can be created. In some embodiments, a basic user account includes email address and password only, or the use of a social media profile to log in.

A buyer terminal 204 can connect with a real estate agent in bid management platform 102 or 202 prior to making an offer. Connected agents can perform non-offer related services including but not limited to saving homes, saving searches and scheduling tours on behalf of buyers. Agents should register with bid management platform and have their license and brokerage information verified prior to connecting with buyers on the bid management platform.

Buyers and their agents can schedule home tours and provide feedback upon attending a home tour scheduled through bid management platform. Buyers and their agents can ask a question to the seller and their agent about the property directly from a "seller Q&A" section of the listing on the website. The question will be publicly visible on the listing, pending the seller's answer and/or approval by the bid management platform or an administrator of the bid management platform. Bid management platform will post the seller's answer and/or approval after the answer and/or approval are received at the bid management platform from the seller terminal.

At step 502, an offer is received at the bid management platform from a buyer terminal 204. After step 502, in this embodiment of method 500, the financial wellness of the buyer is validated at step 503. In some embodiments, the validation of financial wellness occurs before the bid management platform will accept an offer from the buyer terminal at step 500. Bid management platform can assess the financial wellness of a buyer associated with a buyer terminal. In some embodiments, the bid management platform requires certain information from a buyer associated with a buyer terminal. The bid management platform may require that the buyer terminal create a buyer profile on the bid management platform. A buyer profile comprises the legal contact information for the buyer associated with the buyer terminal. The bid management platform will use the legal contact information to generate agreements. The buyer profile may also comprise additional identifying information such as social security number or taxpayer identification number, and may further comprise bank account information and asset information. The buyer profile is then used to obtain buying power approval. In some embodiments, the bid management platform sets buying power for a buyer profile after financial wellness of the buyer is confirmed. The buying power can comprise a maximum offer limit that the buyer terminal can submit. In some embodiments, the buying power comprises limits on deposit amounts or time to close. In some embodiments, the bid management platform registers a buyer terminal to make offers on a specific property. In some embodiments, the bid management platform performs a verification process to determine or assess the buying power of a buyer on the bid management platform. The bid management platform performs this verification of buyers for buyers who are financing a purchase or making an all-cash offer. The verification process ensures that offers received by the bid management platform are from buyers that can afford the property. Buyers can obtain financing from any lender of their choosing.

In some embodiments, the bid management platform assesses a buyer's financial wellness by running a credit check, checking bank account balances, reviewing tax returns, assessing assets owned, or some combination thereof. In some embodiments, the bid management platform communicates with a third party to assess a buyer's financial wellness. Once approved via the financial wellness check at step 503, the bid management platform enables buying power for the buyer for a certain duration of time, e.g., 30, 60, 90, or 120 days, or a number of weeks, or a number of months. After the buying power time period expires, the buyer profile expires or the bid management platform requires the buyer profile to submit to an updated financial wellness verification prior to the bid management platform accepting offers from the buyer terminal. In some embodiments, the expired buyer profile can be renewed by performing another financial wellness check. In some embodiments, the bid management platform determines a maximum offer price a buyer may make based on the results of the financial wellness check.

The bid management platform verifies the financial wellness of buyers associated with buyer terminals by an appropriate financial assessment, including financial analysis of income, asset check, acceptance of a banking information letter from a financial institution, or a credit history check. Further, in some embodiments, a buyer submits an application for preapproval from a lender, or other financial institution, to demonstrate that the buyer associated with the buyer terminal is able to make offers on the bid management platform. In the event that an offer made by a buyer terminal is determined to be the winning offer, the buyer can obtain financing from the lender of their choice, if financing is required.

In some embodiments, a buyer undertakes a preapproval process for financing through the bid management platform. In such embodiments, a buyer provides contact information including name, address, email and phone, which the bid management platform may share with a third party lender. The bid management platform may require additional information necessary to evaluate the financial condition or creditworthiness of the buyer.

In some embodiments, a buyers, and agent, if applicable, register to make offers prior to making their first offer on a given property. Registration can occur in a number of ways. For example, a buyer can select an active buyer profile. A buyer can authorize their agent to make offers on their behalf. The bid management platform may require a buyer to provide credit card information to bid management platform's third-party payment processor. In some embodiments, the bid management platform will only charge the credit card if buyer either (i) fails to initiate payment for the winning offer deposit within a prescribed time period after the determination of the winning offer; or (ii) initiates payment for the winning offer deposit within the prescribed time period but buyer's funds are not received by bid management platform or the designated seller's bank within a time period set by the bid management platform. In the event of (i) or (ii), the bid management platform may charge buyer's credit card a fee. Buyer, and buyer's agent, if applicable, must agree to the bid management platform buyer agreement which commits the buyer to purchasing the property if their offer becomes the winning offer.

Buyers may authorize a real estate agent to make offers on buyer's behalf for a specific property or may choose to make offers on their own. Agents should be licensed in the state that the property is located and should register with bid management platform to have their license and brokerage information verified prior to using the bid management platform to make offers on a property. By authorizing an agent to make offers on their behalf, the buyer relinquishes control to make offers on a property to their agent and cannot make an offer on their own for that specific property. In some embodiments, the identify of buyer associated with a buyer terminal or identifying information in a buyer profile associated with a buyer terminal are masked for privacy and anonymity when making offers.

The offer window is the length of time during which buyer terminals can submit offers on a property to the bid management platform. In some embodiments, the offer window commences when the bid management platform receives an offer that meets or exceeds the list price and accepts the seller terms. In some embodiments, the offer window does not begin on a specific day or time like that of a traditional auction but instead begins when a first offer that meets or exceeds the list price and accepts seller terms is received by the bid management platform. In some embodiments, the offer window commences when the bid management platform receives notification from the seller terminal selecting an offer. When creating the listing for a property or submitting information to create a listing for a property, in some embodiments, seller terminal sets the duration of the offer window. The offer window can vary in duration, e.g., a number of days, weeks, hours, or months. In some embodiments, the offer window lasts from 1-30 days, 1-60 days, or 1-90 days. In other embodiments, the offer window lasts for one week, two weeks, or three weeks. The bid management platform can set a maximum amount of time for the offer window. The offer window will end after the amount of time has passed from the time the bid management platform received the first offer. In some embodiments, the offer window will end when a buy-it-now offer is made. In some embodiments, when a higher offer is made within a predetermined amount of time prior to the end of the offer window, e.g., within 15, 30, 60, or more minutes, the bid management platform extends the offer window for an increment of time, e.g., by 15, 30, 60 or more minutes. In some embodiments, when a higher offer is made within a predetermined amount of time prior to the end of the offer window, e.g., within 15, 30, 60, or more minutes, the bid management platform resets the offer window timer to a predetermined countdown point, e.g., 15, 30, or 60 minutes.

As noted, in some embodiments, the offer window does not begin until the bid management platform receives an offer from a buyer terminal that meets or exceeds the list price and accepts the seller terms. Once this first offer is made, the bid management platform starts counting down the offer window timer. In some embodiments, the offer window closes and the bid management platform will not accept further offers when 1) the timer expires or 2) a buyer terminal submits a buy-it-now offer to the bid management platform. In some embodiments, when the timer expires and the list price is met or exceeded by an offer submitted from a buyer terminal, the bid management platform determines the winning offer at step 504 and changes the status of the property to "Under Agreement" on the website at step 505 before terminating at step 506.

Buyer terminals can submit offers to the bid management platform a listed property before or during an active offer window. Before an offer window begins, a buyer has options to choose from when submitting an offer. First, a buyer terminal can submit an offer that meets or exceeds the list price and accepts the seller terms. In some embodiments, the bid management platform starts the offer window timer upon receipt of this offer. Second, a buyer terminal can submit a conditional offer request, which is discussed below. Third, a buyer terminal can submit an offer comprising an offer price that equals or exceeds the buy-it-now price and accepts the buy-it-now terms. In some embodiments, when the bid management platform receives an offer from a buyer terminal that meets or exceeds the buy-it-now price and accepts the buy-it-now terms, the bid management platform terminates the offer window timer, determines this offer as the winning offer, and indicates that the property is under agreement. Fourth, a buyer terminal can submit a conditional buy-it-now request comprising an offer price equal to or greater than the buy-it-now price and requesting a change to the buy-it-now terms. Fifth, in certain embodiments, the buyer terminal can submit, and the bid management platform will accept, an offer comprising any offer price and any terms.

During an active offer window, a buyer has multiple options to choose from when submitting an offer. First, a buyer terminal can submit an offer higher than the current offer. A buyer is aware of the current high offer because the bid management platform displays, or causes to be displayed, either the highest current offer for a property or all offers made for a property. In some embodiments, the bid management platform or seller terminal requires that the total offer value be a set percentage higher or a set monetary amount higher than the current highest offer. In some embodiments, the monetary amount of the offer must be higher than the list price. In some embodiments, the bid management platform displays on a website all offers received from buyer terminals. Alternatively, a buyer terminal can submit a buy-it-now offer comprising an offer price that meets or exceeds the buy-it-now price and accepts the buy-it-now terms. In some embodiments, a buyer can make buy-it-now offer at any time prior to the offer window expiring. In some embodiments, when the bid management platform receives an offer from a buyer terminal that meets or exceeds the buy-it-now price and accepts the buy-it-now terms, the bid management platform terminates the offer window timer, determines this offer as the winning offer agreement, and indicates that the property is under agreement. In some embodiments, the bid management platform receives a conditional buy-it-now offer comprising an offer price that meets or exceeds the buy-it-now price and a proposed or requested change to the buy-it-now terms. In such embodiments, the bid management platform can require acceptance of the conditional buy-it-now offer from the seller terminal before the bid management platform terminates the offer window timer, determines this offer as the winning offer agreement, and indicates that the property is under agreement.

To send an offer to the bid management platform at step 502, a buyer terminal submits an offer comprising the monetary amount of the offer price and a selection of an option for each of the seller terms that have selectable options. In some embodiments, the bid management platform requires an offer to affirmatively accept and/or acknowledge seller terms that do not have selectable options. In some embodiments, buyer reviews the offer summary and affirmatively acknowledges making the offer. In some embodiments where a buyer uses an agent, the bid management platform requires that the buyer review and approve an offer prepared by the agent before the offer is accepted by the bid management platform. In some embodiments, the bid management platform sends, or causes to be sent, an email, text message, or in-app notification to the buyer terminal immediately upon receipt of the submitted offer.

As noted, options for seller terms may have a positive or negative value assigned to them by the seller. As a buyer selects the options they agree to as part of their offer, the sum of these values is called the "terms value." A "total offer value" is calculated by adding the monetary amount of the offer with the terms value. Total offer value enables seller to accurately evaluate and compare offers during an offer window. In some embodiments, after making a higher offer, the bid management platform deems the current highest offer. In some embodiments, the bid management platform makes the current highest offer publicly visible in the listing's offer history on a website. In some embodiments, the bid management platform makes all previously submitted offers publicly visible in the listing's offer history on the website.

In some embodiments, the buy-it-now price is the monetary amount that seller has committed to accept from a buyer to terminate the offer window, discontinue accepting further offers, and place the property under contract for sale based on the buy-it-now price and buy-it-now terms. A buyer terminal can submit a buy-it-now offer before or during an active offer window. In some embodiments, when the bid management platform receives a buy-it-now offer, the bid management platform immediately terminates the offer window timer if the timer is active. In some embodiments, if the bid management platform receives a buy-it-now before an active offer window, the bid management platform prevents the offer window timer from starting. In some embodiments, after receiving a buy-it-now offer, the bid management platform deems the buy-it-now offer as the winning offer and displays it in the listing's offer history. In some embodiments, the seller terminal can change the buy-it-now price and/or buy-it-now terms prior to or during an active offer window. In some embodiments, a seller terminal adds the buy-it-now price and/or the buy-it-now terms during an active offer window. In certain embodiments, the seller terminal adds the buy-it-now price and buy-it-now terms after the offer window expires and a winning offer is determined.

In some embodiments, the bid management platform determines a buy-it-now offer as the winning offer if submitted by a buyer terminal prior to offer window timer starting or prior to an offer window timer expiring. In other embodiments where a buy-it-now offer has been not received by the bid management platform, the bid management platform determines the winning offer as the offer that meets or exceeds the minimum list price, accepts the seller terms, and has the highest total offer value at the expiration of the offer window.

In some embodiments, when a buyer terminal is determined to have submitted the winning offer and the property is placed under agreement at step 505, the bid management platform may require a fee from the seller terminal, the buyer terminal, or both. In some embodiments, the fee is paid to the bid management platform at the time of closing or before the time of closing of the real estate transaction. In some embodiments, the buyer, seller, seller's agent, buyer's agent, or a third party pays the fee. In some embodiments, the fee may be an amount equal to percentage of the monetary amount of the winning offer, a set fee for a Final Offer being submitted, a flat fee, a subscription fee, a lead generation fee, a one-time access fee, an advertising fee, a partner program fee, an Application Programming Interface ("API") fee when the bid management platform is integrated into a third party service, and/or a partner/provider fee.

Figure 6:
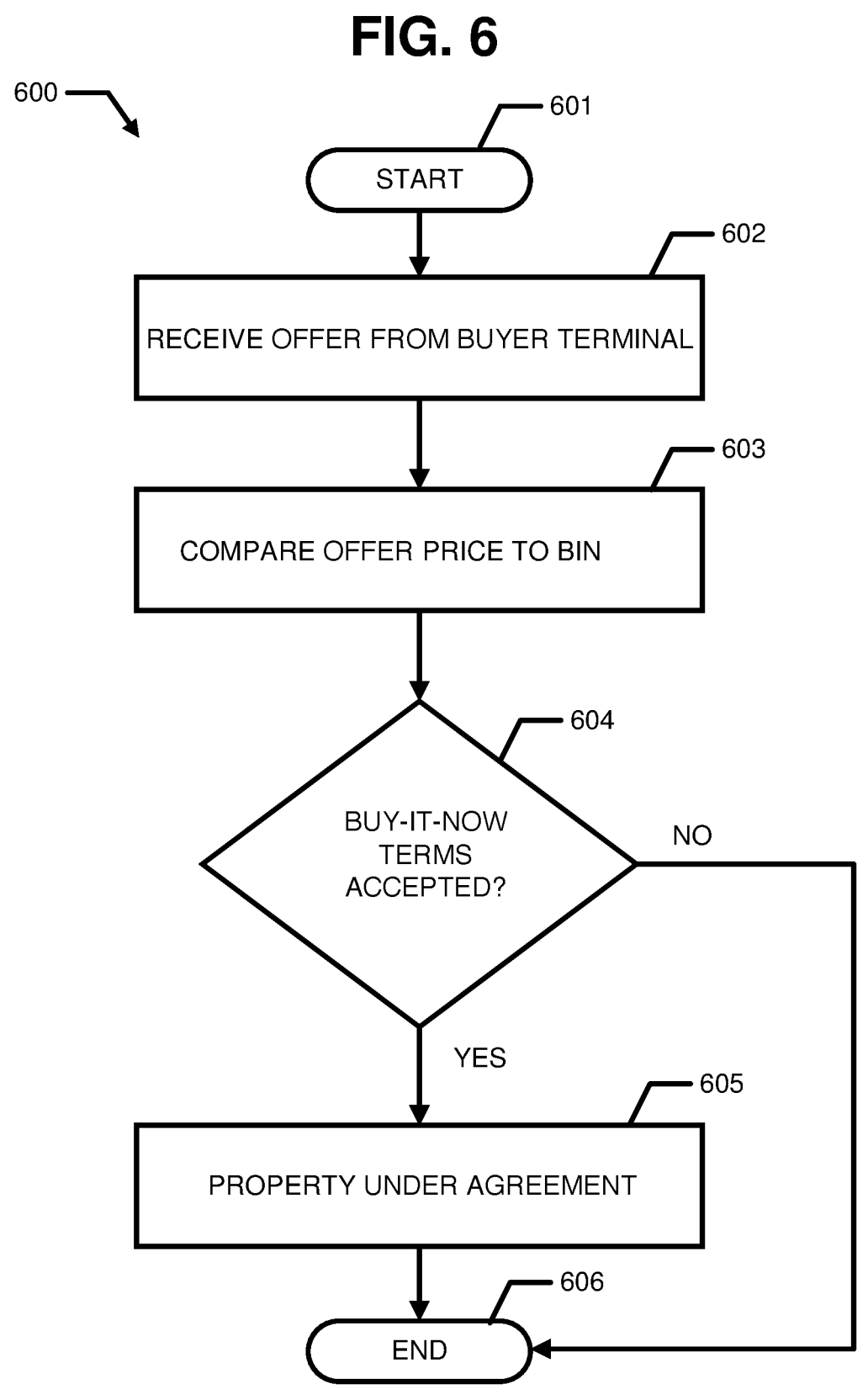

FIG. 6 is a flow diagram that illustrates the steps performed when a buyer terminal submits a final offer to the bid management platform. In contrast to method 500 as described in FIG. 5, the method 600 allows for a buy-it-now to be submitted for a property that immediately places the property under agreement for sale.

After method 600 commences at step 601, the bid management platform receives an offer from a buyer terminal at step 602. At step 603, the offer price in the offer is compared to the buy-it-now ("BIN" at 603) price submitted by the seller terminal. If the offer price equals or exceeds the amount of the buy-it-now price and accepts the buy-it-now terms at step 604, then the offer is deemed a winning offer at 605 and the property status changes in the bid management platform to "Under Agreement." Method 600 terminates at step 606.

In some embodiments, the bid management platform generates a winning offer agreement comprising the terms of the winning offer. The bid management platform generates the winning offer agreement at the time, or shortly thereafter, of the winning offer at step 505 of method 500, or step 605 of method 600, when the bid management platform changes the status of the property to under agreement. In some embodiments, a winning offer commits the winning buyer to purchase the property for the offer price and the accepted terms. In some embodiments, the bid management platform creates a winning offer agreement that will be automatically accepted by seller as agreed upon by the seller during creation of the listing. Buyer understands and acknowledges that buyer's offer shall legally bind buyer, except where applicable state law would not consider such offer to be legally binding. As such, where an offer to purchase the property is deemed to be the winning offer, buyer is committed to purchase the property.

The winning offer agreement shall be deemed accepted by seller upon attachment to the winning offer agreement of documentation evidencing seller's commitment to sell the property on the terms identified. In some embodiments, buyer expressly acknowledges that the bid management platform seller agreement executed by seller at the time of listing the property on the bid management platform service constitutes evidence of seller's commitment to sell the property on the terms identified on the winning offer agreement. Seller and their agent further understand and acknowledge that such offer shall legally bind seller, except where applicable state law would not consider such offer to be legally binding. As such, where an offer to purchase the property is deemed to be the winning offer, seller is committing to proceed with the sale of the property. Upon such acceptance, the winning offer agreement shall form a legally binding agreement.

After the bid management platform determines the winning offer, the winning buyer has certain amount of time to make the winning offer deposit. This amount of time can vary and can be set by the seller or the bid management platform. The amount of time can be, for example, 24-48 hours, 1-5 business days, or some other time period set by the bid management platform and/or the seller, to make the winning offer deposit. The winning offer deposit is calculated as a monetary amount or a certain percentage of the monetary amount of the winning offer. The winning offer deposit will be held by an escrow agent, subject to any applicable terms stored in the seller parameters module 304. In some embodiments, the seller terminal sets the required winning deposit amount when creating the listing or submitting information to create the listing.

The bid management platform may require buyer terminals to acknowledge that the seller is under no obligation to perform under the winning offer agreement if buyer fails to initiate payment for the winning offer deposit within a certain amount of time.

In the event that seller refuses to perform under the winning offer agreement, seller may owe buyer a fee, which may be 1% of the monetary amount of the winning offer or some other predetermined amount. Seller is considered refusing to perform under the winning offer agreement when seller notifies buyer that seller will not sell the property to buyer, and such notice is made by seller any time after the winning offer agreement has been accepted and the buyer has complied with initiating the winning offer deposit within the set amount of time, and has produced sufficient funds.

In the event that seller refuses to comply with the terms of the winning, the bid management platform may prohibit seller from accessing the bid management platform in the future.

In another aspect, this disclosure provides methods and systems related to conditional offers. A conditional offer is a request from a buyer terminal to the bid management platform to change the minimum offer price or seller terms, or both, of a listing. The seller can accept or reject the request. If accepted, the seller terminal updates the listing to reflect the requested changes. In some embodiments, these updates are only visible to the buyer terminal that made the conditional offer request, so that the buyer terminal can then submit an offer in accordance with the updated terms. The buyer terminal submits an offer using or exceeding the updated terms to the bid management platform. In some embodiments, the bid management platform only accepts conditional offers before an active offer window. In some embodiments, the bid management platform accepts conditional offers during an active offer window or at another time.

A conditional offer request comprises 1) the monetary amount of an offer price that the buyer terminal proposes and/or 2) seller terms that buyer terminal proposes to change, if any. The monetary amount can be less than, equal to, or greater than the list price.

The seller terminal can accept or reject the conditional offer request. If accepted, the seller terminal edits the listing to reflect the changes. In some embodiments, a bid management platform administrator module may review the edited listing prior to the listing being sent to the buyer terminal. Once reviewed, in some embodiments, the edited listing will be visible only to the buyer terminal that submitted the conditional offer request. In some embodiments, the bid management platform does not review the edited listing and sends the edited listing to the buyer terminal. If the seller terminal rejects the conditional offer, the bid management platform sends a rejection notification to the buyer terminal.

Buyer terminal submits an offer that includes the updated terms. The monetary amount of the offer should be greater than or equal to the monetary amount included in the conditional offer request. After the buyer terminal successfully submits the conditional offer, the bid management platform starts the offer window timer and publicly displays the offer and the updated listing.

Figure 7:
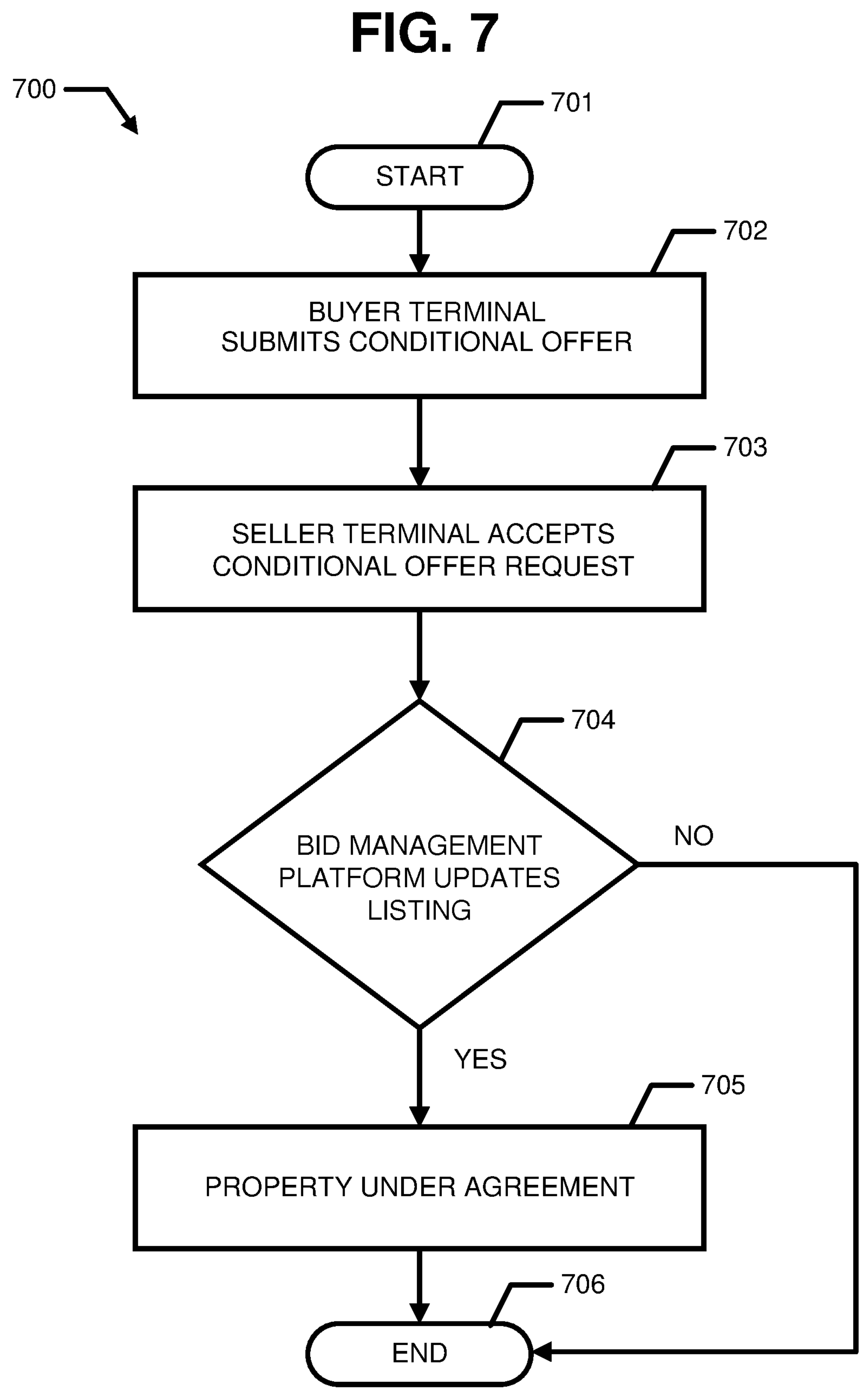
FIG. 7 is a block diagram illustrating the conditional offer process via the bid management platform.

FIG. 7 is a block diagram illustrating the conditional offer process 700 in greater details as initiated by a buyer terminal at step 701 via the bid management platform. A buyer terminal submits a conditional offer to the bid management platform at step 702. If the bid management platform receives an acceptance of the conditional offer from the seller terminal at step 703, the bid management platform updates the listing. In some embodiments, the bid management platform first updates the listing so only buyer terminal can see the updated listing and submit an offer to match the previously requested terms that are now reflected in the updated listing. In other embodiments, once bid management platform receives notification of acceptance of the conditional offer from the seller terminal, the bid management platform updates the listing on the website and posts the offer details. In some embodiments, the bid management platform also starts an offer window timer. If the offer becomes the winning offer, the bid management platform places the property under agreement immediately at step 705 and method 700 terminates at step 706. If the offer price does not become the winning offer, then the method 700 terminates at step 706.

In some embodiments, the bid management platform accepts conditional offers before or during an active offer window. In some embodiments, the bid management platform does not accept conditional offers during an active offer window.

This disclosure also provides for conditional buy-it-now offers. A seller terminal can elect to receive conditional buy-it-now offers. Alternatively, a bid management platform may default to accepting conditional buy-it-now offers. A conditional buy-it-now offer comprises an offer price that meets or exceeds the buy-it-now price and comprises a request or proposal to change one or more of the buy-it-now terms. A seller terminal can reject or accept a conditional buy-it-now offer. If the seller terminal rejects the conditional buy-it-now offer, the listing of the property remains unchanged. If the seller terminal accepts the conditional buy-it-now offer, the bid management platform terminates an active offer window (if an offer window is active), updates the listing to reflect that the property under agreement, and sends a notification to the seller terminal and buyer terminal indicating that the conditional buy-it-now offer has been accepted and the property is under agreement. In some embodiments, the bid management platform generates a winning agreement comprising the buy-it-now offer price and the accepted buy-it-now updated terms.

In another aspect, this disclosure provides methods and systems that allow more flexibility for the seller. In some embodiments of this aspect, the seller terminal provides a list price and seller terms, but is not required to sell the home if an offer meets or exceeds the list price and accepts the seller terms. In some embodiments, the seller terminal also provides a buy-it-now price and buy-it-now terms when providing initial listing information. The bid management posts the listing comprising the list price and the seller terms on a website. In some embodiments, the seller terminal adds a buy-it-now price and buy-it-now terms to the listing after the listing is posted. In some embodiments of this aspect, the bid management platform accepts all offers from buyer terminals, regardless of whether the offers meet or exceed the list price and/or accept the seller terms. In certain of these embodiments, the seller terminal can set a deadline for offers. Once the deadline passes, the bid management platform will not accept any further offers. Before or after the deadline, the seller terminal can accept one of the offers or can instruct the bid management platform to post all of the offers on the website and start and offer window timer. In certain embodiments, the seller terminal is not required to set a deadline for offers and can accept an offer at any time.

In some embodiments, the seller terminal can accept one of the offers and instruct the bid management platform to post the accepted offer or all of the received offers on the website and start an offer window timer. In some embodiments, the bid management platform sends a notification to all registered buyer terminals or to buyer terminals registered for this listing, that an offer window timer has started, At the conclusion of offer window timer, if no other offers are received by the bid management platform, the bid management platform determines the offer that the seller terminal accepted to be the winning offer and sends a notification to the seller terminal and the buyer terminal that submitted the offer. In some embodiments, because the seller terminal accepted the offer, the buyer terminal is still required to purchase the property if the accepted offer becomes the winning offer at the expiration of the offer window.

If additional offers are received during the active offer window, the bid management platform calculates the total offer value for each offer. The bid management platform the compares total offer values of each received offer and the previously-accepted offer and determines a winning offer as the offer with the highest total offer value. In some embodiments during the active offer window, the bid management platform will not accept an offer from a buyer terminal unless the offer's total offer value exceeds the total offer value of the offer the seller terminal accepted or if the offer price exceeds the previously accepted offer price.

In some embodiments, the seller terminal instructs the bid management platform to add a buy-it-now price and buy-it-now terms during the active offer window. In some embodiments, the seller terminal can instruct the bid management platform to increase the buy-it-now price, change the buy-it-now terms, and/or remove the buy-it-now price and buy-it-now terms.

The invention claimed is:

1. A computer-implemented method of facilitating a sale of property using a bid management platform, comprising:

registering a seller terminal with the bid management platform;

receiving, at the bid management platform, seller information comprising identification details of a property, a minimum offer price, and seller terms, wherein one of the seller terms comprises a selectable option;

calculating, at the bid management platform, a first total offer value based on the minimum offer price and the seller terms;

sending, from the bid management platform to the seller terminal, a seller agreement indicating that the property is to be sold if the bid management platform receives an offer to purchase the property that comprises a total offer value that meets or exceeds the first total offer value;

creating, at the bid management platform, a listing comprising the identification details, the minimum offer price, and the seller terms;

by the bid management platform, causing the listing to be displayed on a website;

assigning, at the bid management platform, an option value to the selectable option, wherein the option value comprises a dollar amount or a percentage of an offer price;

registering a plurality of buyer terminals with the bid management platform;

receiving, at the bid management platform, a buying power amount associated with a first one of the plurality of buyer terminals before the first one of the plurality of terminals submits an offer;

receiving, at the bid management platform from the first one of the plurality of buyer terminals, an offer to purchase the property, the offer comprising an offer price and a selection of the selectable option;

calculating, at the bid management platform, a second total offer value based on the offer price and the option value of the selected option;

by the bid management platform, starting an offer timer window when the second total offer value meets or exceeds the first total offer value;

by the bid management platform, causing the offer to be displayed on the website;

by the bid management platform, sending to the plurality of buyer terminals a notification indicating that an offer was received;

upon expiration of the offer window timer, sending, from the bid management platform to the seller terminal, a sale notification comprising a winning offer, winning total offer value, and notification that the property is under agreement for sale; and updating the listing to identify the property as under agreement for sale.

2. The method of claim 1, wherein the seller information further comprises a buy-it-now price and buy-it-now terms and the listing further comprises the buy-it-now price and the buy-it-now terms.

3. The method of claim 2, wherein when the offer price equals the buy-it-now price, the method further comprises terminating the offer window timer and sending the sale notification.

4. The method of claim 1, wherein the option value is received at the bid management platform from the seller terminal.

5. The method of claim 1, further comprising:

generating, at the bid management platform, a winning agreement comprising the offer price, seller terms, and the selected option; and sending the winning agreement to the first one of the plurality of buyer terminals.

6. The method of claim 1, further comprising:

receiving, at the bid management platform from a second one of the plurality of buyer terminals, a second offer to purchase the property, the second offer comprising a second offer price and a second selected option;

calculating, at the bid management platform, a third total offer value for the second offer, wherein the third total offer value is based on the second offer price and the option value of the second selected option; and upon expiration of the offer window timer, determining the winning offer as the offer having the highest total offer value.

7. The method of claim 6, further comprising causing the second offer to be displayed on the website.

* * * * *